United States Patent

Kayukawa et al.

[11] Patent Number: 5,562,182
[45] Date of Patent: Oct. 8, 1996

[54] OIL DIVERTING UNIT FOR A REFRIGERANT COMPRESSOR

[75] Inventors: Hiroaki Kayukawa; Kazushige Murao; Osamu Hiramatsu; Shigeki Kanzaki, all of Kariya, Japan

[73] Assignee: Kabushiki Kaisha Toyoda Jidoshokki Seisakusho, Aichi, Japan

[21] Appl. No.: 343,631

[22] Filed: Nov. 22, 1994

[30] Foreign Application Priority Data

Nov. 24, 1993 [JP] Japan ..................... 5-293353

[51] Int. Cl.⁶ ............... F01M 1/00; F01B 3/00; F04B 1/12
[52] U.S. Cl. ............... 184/6.17; 91/499; 92/71; 92/154; 417/269; 277/9.5; 277/11; 277/59; 277/184; 277/186; 29/235; 29/280
[58] Field of Search ............... 184/6.17, 6.16, 184/6.27; 91/499; 92/71, 86, 154; 417/269; 277/9.5, 11, 152, 59, 68, 178, 184, 186; 81/176.1, 176.15; 29/235, 270, 280

[56] References Cited

U.S. PATENT DOCUMENTS

| | | | |
|---|---|---|---|
| 3,029,503 | 4/1962 | Meyer | 29/235 |
| 3,183,847 | 5/1965 | Raymond | 417/269 |
| 4,159,828 | 7/1979 | Östling et al. | 277/184 |
| 4,520,712 | 6/1985 | Hovorka et al. | 417/269 |
| 5,137,431 | 8/1992 | Kiyoshi et al. | 417/269 |

FOREIGN PATENT DOCUMENTS

| | | | |
|---|---|---|---|
| 0347587 | 12/1989 | European Pat. Off. | 277/152 |
| 4124221 | 1/1993 | Germany | 277/152 |
| 4121950 | 1/1993 | Germany | 277/152 |
| 110408 | 9/1975 | Japan . | |
| 0298473 | 12/1990 | Japan | 29/235 |
| 0185975 | 7/1992 | Japan | 277/152 |
| 1038547 | 8/1983 | U.S.S.R. | 91/499 |
| 0589511 | 3/1945 | United Kingdom | 277/152 |
| 0646371 | 11/1950 | United Kingdom | 417/269 |

Primary Examiner—F. Daniel Lopez
Assistant Examiner—Christopher Verdier
Attorney, Agent, or Firm—Burgess, Ryan and Wayne

[57] ABSTRACT

An oil diverting unit, incorporated in a compressor housing of a refrigerant compressor for a climate control system of an automobile, cooperating with a shaft seal unit mounted on a drive shaft of the compressor, so as to divert a flow of the lubricating oil which was suspended in the refrigerant gas and has leaked out of the interior of the compressor housing, to thereby prevent the lubricating oil from reaching a solenoid clutch mounted on a front portion of the drive shaft of the compressor. The oil diverting unit has an oil blocking plate member made of elastic material so that the plate member is elastically press-fitted in the compressor housing so as to define an oil dam for holding the lubricating oil and permitting the oil to be drained from the dam through a drain passageway toward the exterior of the compressor housing.

11 Claims, 8 Drawing Sheets

1

OIL DIVERTING UNIT FOR A REFRIGERANT COMPRESSOR

BACKGROUND OF THE INVENTION

1. Field of the Invention

The present invention relates to a device for obstructing the flow of lubricating oil leaking from the shaft-seal unit mounted on the drive shaft of a refrigerant compressor. More particularly, the present invention relates to a device for obstructing the flow of lubricating oil leaking from the shaft-seal unit on the drive shaft of a refrigerant compressor used for a climate control system of an automobile, so that an oil-dam is provided between the foremost end of the drive shaft and the shaft-seal unit mounted thereon, whereby lubricating oil which oozes out of the interior of the compressor body along the drive shaft is collected and diverted by an oil-dam, and is gradually drained away through a drain conduit formed in the body of the compressor.

2. Description of the Related Art

A refrigerant compressor, such as a swash plate type compressor or a wobble plate type compressor, used for compressing refrigerant gas in a climate control system of an automobile is provided with a drive shaft rotated by an automobile engine via a solenoid clutch unit so as to reciprocate pistons in cylinder bores of the cylinder block of the compressor. The drive shaft is rotatably held by the cylinder block and the compressor housing via anti-friction bearings, and the foremost end of the drive shaft is extended outward beyond the end of the housing so that it may be connected to the automobile engine. Therefore, a seal unit for making an oil-tight seal between the drive shaft and the housing is arranged adjacent to the anti-friction bearing held by the housing so that the interior of the compressor is isolated from the exterior of the compressor. Nevertheless, the interior of the body of the compressor is subjected to a high pressure during the operation of the compressor, and accordingly, lubricating oil suspended in the refrigerant gas is oozed out of the body through the shaft seal unit. The lubricating oil then flows toward the foremost end of the drive shaft along the surface thereof. As a result, a given part of the lubricating oil leaking through the seal unit of the drive shaft enters a solenoid clutch, i.e., a unit connecting the automobile engine and the drive shaft of the compressor, which is mounted on the foremost end of the drive shaft. In the solenoid clutch, the lubricating oil wets the faces of clutch plates and therefore, the clutch plates can slip and a power transmission from the automobile engine to the compressor is not properly performed.

Several measures have already been proposed, according to the prior art, to prevent the lubricating oil from leaking out of the compressor through the seal unit.

For example, Japanese Unexamined Utility Model Publication No. 50-110408 (JU-A-'408) discloses a prior art measure in which an oil absorbing member, made of oil absorbing material such as a felt material, is arranged adjacent to and in front of the shaft-seal unit in the axial bore of the housing of the compressor so as to absorb lubricating oil.

Another measure, in which a shaft seal member 61 is provided for sealing a drive shaft 68 extending through a central bore of a compressor housing 63, is shown in FIGS. 8 and 9. An oil blocking element 62, in the form of a bored disk having a curved edge, is press-fitted in the central bore 63a of the housing 63 so as to obstruct the flow of the leaking lubricating oil oozing through the shaft seal member 61. The lubricating oil obstructed by the oil block element 62 remains in an oil dam portion disposed between the oil block element 62 and the shaft seal member 61, and is gradually drained from the dam portion through a drain passageway 64 toward the exterior of the compressor. The oil blocking element 62 is made of a metallic plate 66 such as a steel plate coated with rubber material 5.

Nevertheless, the above-mentioned prior art measures have the defects described below.

The oil absorbing member of JU-A-'408 is insufficient in that it can absorb only a limited amount of the lubricating oil. Therefore, a certain amount of the lubricating oil cannot be absorbed by the oil absorbing member after the continuous use the oil absorbing member due to the fact that the oil absorbing member becomes impregnated with the lubricating oil after an extended operation of the compressor.

In the case of the oil blocking element 62 of the prior art, shown in FIGS. 8 and 9, the rubber portion 65 of the element 62 is elastically fitted in the central bore 63a of the housing 63 of the compressor. Therefore, it can be understood that when the oil blocking element 62 is manufactured, the rubber material 65 coating the metallic plate 66 is often broken at the stage where the peripheral portion of the metallic plate 66 is bent so as to form the curved periphery of the oil block element 62. This is because the rubber material 65 is excessively stretched during the bending process of the metallic plate 66.

On the other hand, when the rubber coating material 65 is applied to the metallic plate 66 after the bending of the periphery thereof, the coating process is very difficult and this increases the manufacturing cost of the oil blocking element 62.

Further, the bending of the metallic plate 66 must be done under precise dimensional control of the outer diameter of the oil blocking element 62 so that it may be accurately fitted and seated in the central bore 63a of the compressor housing 63. When the outer diameter of the oil blocking element 62 is larger than a predetermined dimension and outside the dimensional allowance, either the outer surface of the oil blocking element 62 or the bore surface of the housing 63 is damaged, and the rubber coating 65 may be removed from the metallic plate 66. When the outer diameter of the oil blocking element 62 is smaller than the predetermined dimension and outside the dimensional allowance thereof, the oil blocking element 62 is not sealingly fitted by press-fitting in the central bore 63a of the compressor housing 63, and accordingly, a leakage of oil cannot be completely prevented by the oil block element 62.

SUMMARY OF THE INVENTION

An object of the present invention is therefore to obviate the above-mentioned defects encountered in the prior art measures employed in a refrigerant compressor for an automobile climate control system.

Another object of the present invention is to provide a novel oil diverting unit to be accommodated, in the compressor housing of a refrigerant compressor for an automobile climate control system, at a position adjacent to a shaft seal unit mounted on the drive shaft of the compressor.

A further object of the present invention is to provide a novel oil diverting unit for a shaft seal unit of a refrigerant compressor of an automobile climate control system, which constitutes an oil dam between the foremost end of the drive shaft and the shaft seal unit so as to prevent the lubricating oil leaking out of the shaft seal unit from flowing toward a solenoid clutch mounted on the foremost end of the drive shaft.

A still further object of the present invention is to provide a refrigerant compressor used with a climate control system of an automobile and provided with an oil diverting unit cooperating with a shaft seal unit for the drive shaft of the compressor for obstructing a flow of the lubricating oil leaking out of the interior of the compressor housing to thereby prevent a solenoid clutch for transmitting a power from the automobile engine to the drive shaft of the compressor, from being wetted by the lubricating oil.

In accordance with one aspect of the present invention, there is provided an oil diverting unit for a refrigerant compressor to be incorporated in a climate control system of an automobile, the oil diverting unit cooperating with a shaft seal unit arranged in a central bore of an axially extending portion of a housing of the refrigerant compressor, so as to gas-tightly seal around an axial drive shaft having a fore end portion thereof outwardly extending through the central bore of the axially extending portion of the housing of a refrigerant compressor, the oil diverting unit obstructing a flow of lubricating oil which was suspended in a refrigerant gas and has leaked out of the interior of the housing via the shaft seal unit, wherein the oil diverting unit comprises:

an oil blocking plate member made of an elastic material and press-fitted in said central bore of the axially extending portion of the housing at a position adjacent to an axially outer face of the shaft seal unit, for defining an oil dam between the oil blocking plate member and the shaft seal unit for holding the flow of the lubricating oil leaking out of the interior of the housing via the shaft seal unit, the oil blocking plate member having a central bore thereof through which the fore end portion of the drive shaft extends; and a drain passageway means formed in the housing and having an oil port fluidly communicated with the oil dam for draining the lubricating oil from the oil dam and an oil discharge port communicated with an exterior of the housing for draining the lubricating oil toward the exterior of the housing of the compressor.

The central bore of the oil blocking plate member may have a diameter substantially equal to or slightly less than the diameter of the fore end portion of the drive shaft so as to be in constant contact with the outer circumference of the drive shaft so as obstruct the flow of the lubricating oil directing from the shaft seal unit toward the oil blocking plate member not only along the wall surface of the central bore of the compressor housing but also along the outer circumference of the drive shaft.

The oil blocking plate member may be provided with a central bore having a diameter larger than that of the drive shaft and be formed with at least one recess formed in the inner wall of the central bore thereof to thereby permit the oil blocking plate member to be removed from the compressor by using a suitable tool.

When the refrigerant compressor is operated so as to compress a refrigerant gas, a high pressure prevails in the interior of the compressor. Therefore, a lubricating oil which was suspended in the refrigerant gas gradually tends to leak from a front portion of the compressor along a gap extending around the drive shaft due to the high pressure. However, the shaft seal unit arranged outside and adjacent to an anti-friction bearing rotatably supporting the drive shaft suppresses the leakage of the lubricating oil toward the fore end portion of the drive shaft.

Further, the lubricating oil oozing out of the shaft seal unit toward the fore end portion of the drive shaft is obstructed by the oil diverting unit to thereby be prevented from flowing toward a solenoid clutch mounted on the foremost end of the drive shaft. Namely, when the flow of the lubricating oil is obstructed by the oil obstructing unit, the oil is stored in the dam between the shaft seal unit and the oil obstructing unit, and is drained through the drain passageway means of the compressor housing toward the exterior of the compressor.

When the central bore of the oil blocking plate member of the oil diverting unit is tightly fitted on the fore end portion of the drive shaft, the lubricating oil is completely prevented by the oil diverting unit from flowing toward the solenoid clutch. Accordingly, the solenoid clutch can be protected against the lubricating oil during the operation of the compressor.

When the central bore of the oil blocking plate member of the oil diverting unit is formed so as to have a bore shape different from the outer form (e.g. a round form) of the drive shaft of the compressor, it is possible to remove the oil blocking plate member from the drive shaft of the compressor by withdrawing the plate member by a tool having a tip engageable with the oil blocking plate member through an opening between the oil blocking plate member and the outer surface of the drive shaft.

In accordance with another aspect of the present invention, there is provided a refrigerant compressor adapted for being driven by an automobile engine for compressing a refrigerant gas circulated through a climate control system of an automobile comprising:

a cylinder block provided with a plurality of cylinder bores for receiving respective pistons reciprocating therein so as to compress the refrigerant gas and to discharge the compressed refrigerant gas toward the climate control system;

a front housing connected to a front end of the cylinder block and having a crank chamber therein for receiving a swash plate type piston-reciprocating unit, the front housing including an axially extending boss portion provided with a central bore formed therein, and the crank chamber being subjected to a high pressure of the compressed refrigerant gas during the operation of the compressor;

an axial drive shaft rotatably held by said cylinder block and the front housing for driving the swash plate type piston-reciprocating unit, the axial drive shaft having a fore end portion extending through the central bore of the axially extending boss portion of the front housing;

a shaft-seal unit arranged in the central bore of the axially extending boss portion of the front housing for gas-tightly sealing the crank chamber of the front housing;

a solenoid clutch unit mounted on the fore end portion of the axial drive shaft for connecting the axial drive shaft to the automobile engine upon being energized; and an oil diverting unit cooperating with the shaft seal unit for obstructing a flow of lubricating oil which was suspended in the refrigerant gas and has leaked out of the interior of the crank chamber of the front housing via the shaft seal unit, the oil diverting unit comprising:

an oil blocking plate member made of an elastic material and press-fitted in said central bore of the axially extending boss portion of the front housing at a position adjacent to an axially outer face of the shaft seal unit, for defining an oil dam between the oil blocking plate member and the shaft seal unit for holding the flow of the lubricating oil soaking out of the interior of the front housing via the shaft seal unit, the oil blocking plate member having a central bore thereof through which the fore end portion of the axial drive shaft extends; and a drain passageway means formed in the front housing, and having an oil port fluidly communicated with the oil dam for draining the lubricating oil from the oil dam and an oil discharge port communicated with the exterior of said housing for draining the lubricating oil toward the exterior of the compressor.

BRIEF DESCRIPTION OF THE DRAWINGS

The above and other objects, features and advantages of the present invention will be made more apparent from the ensuing description of preferred embodiments thereof in conjunction with the accompanying drawings wherein.

DESCRIPTION OF THE PREFERRED EMBODIMENTS

Figure 1:
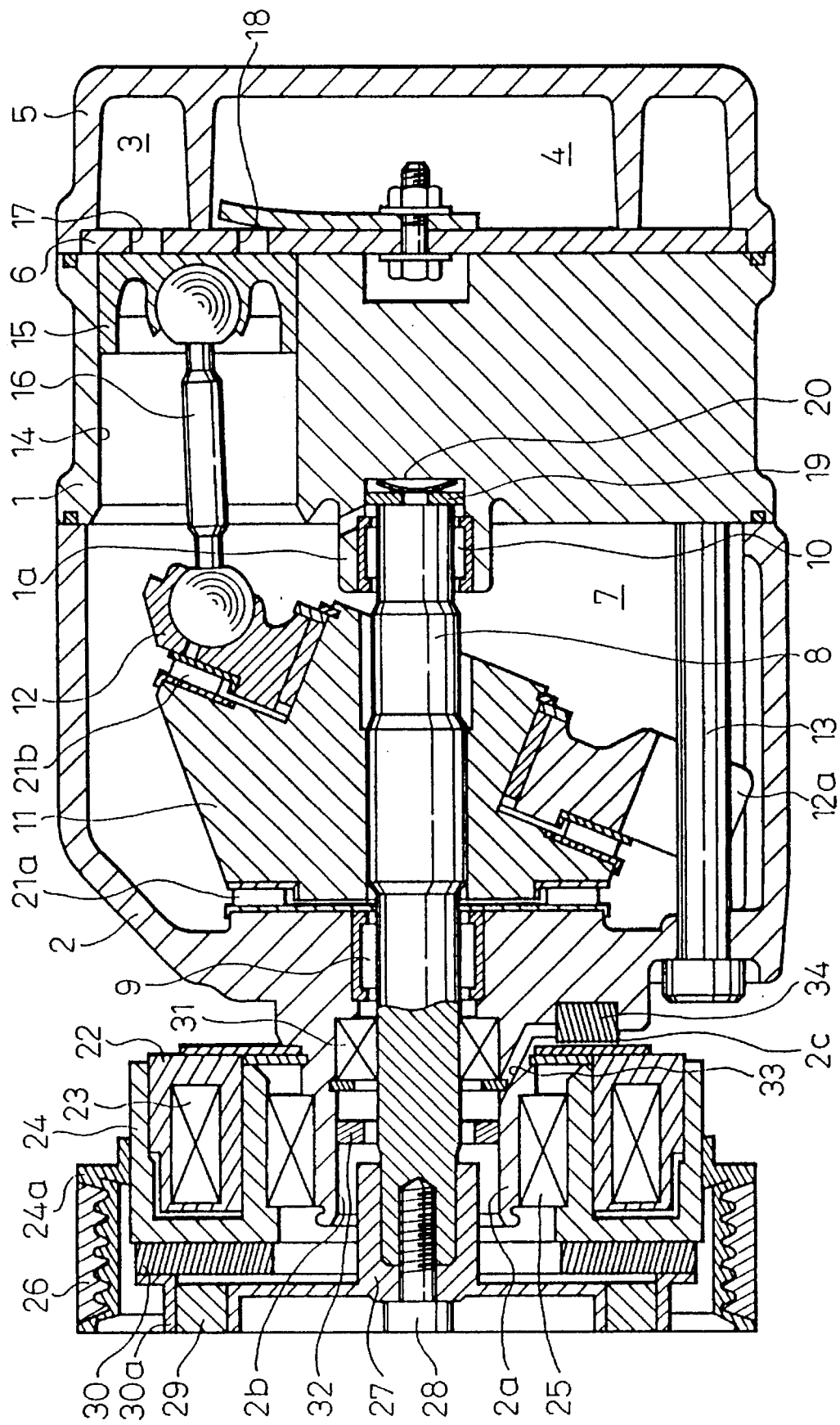
FIG. 1 is a longitudinal cross-sectional view of a refrigerant compressor for an automobile climate control system, incorporating therein an oil diverting unit according to a first embodiment of the present invention.

It should be understood that throughout FIGS. 1 through 7, which illustrate the first through third embodiments of the present invention, identical elements and parts are designated by the same reference numerals.

Figure 2A:
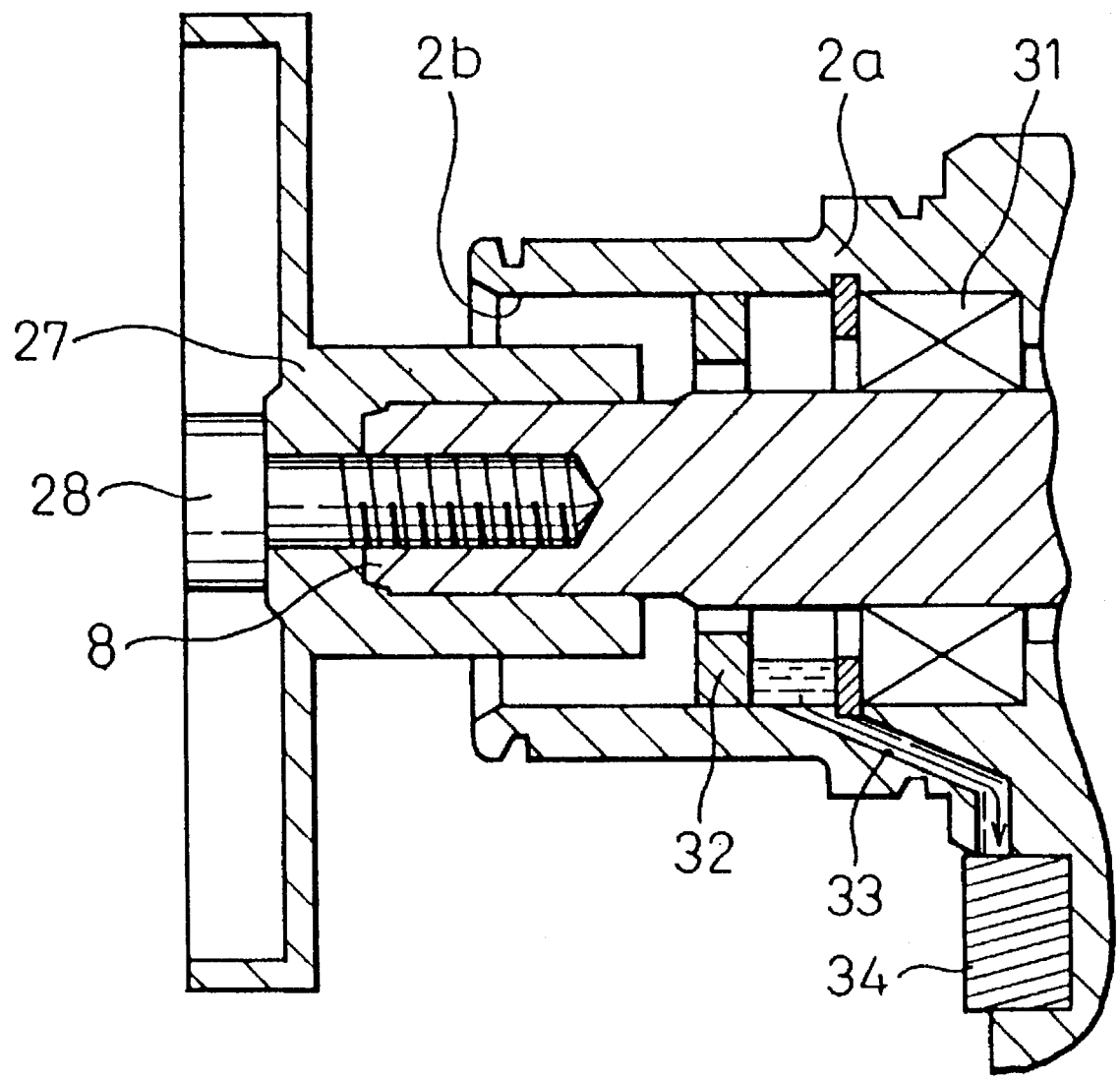
FIG. 2A is an enlarged partial cross-sectional view of the front portion of the compressor, illustrating the oil diverting unit according to the first embodiment of the present invention.
Figure 2B:
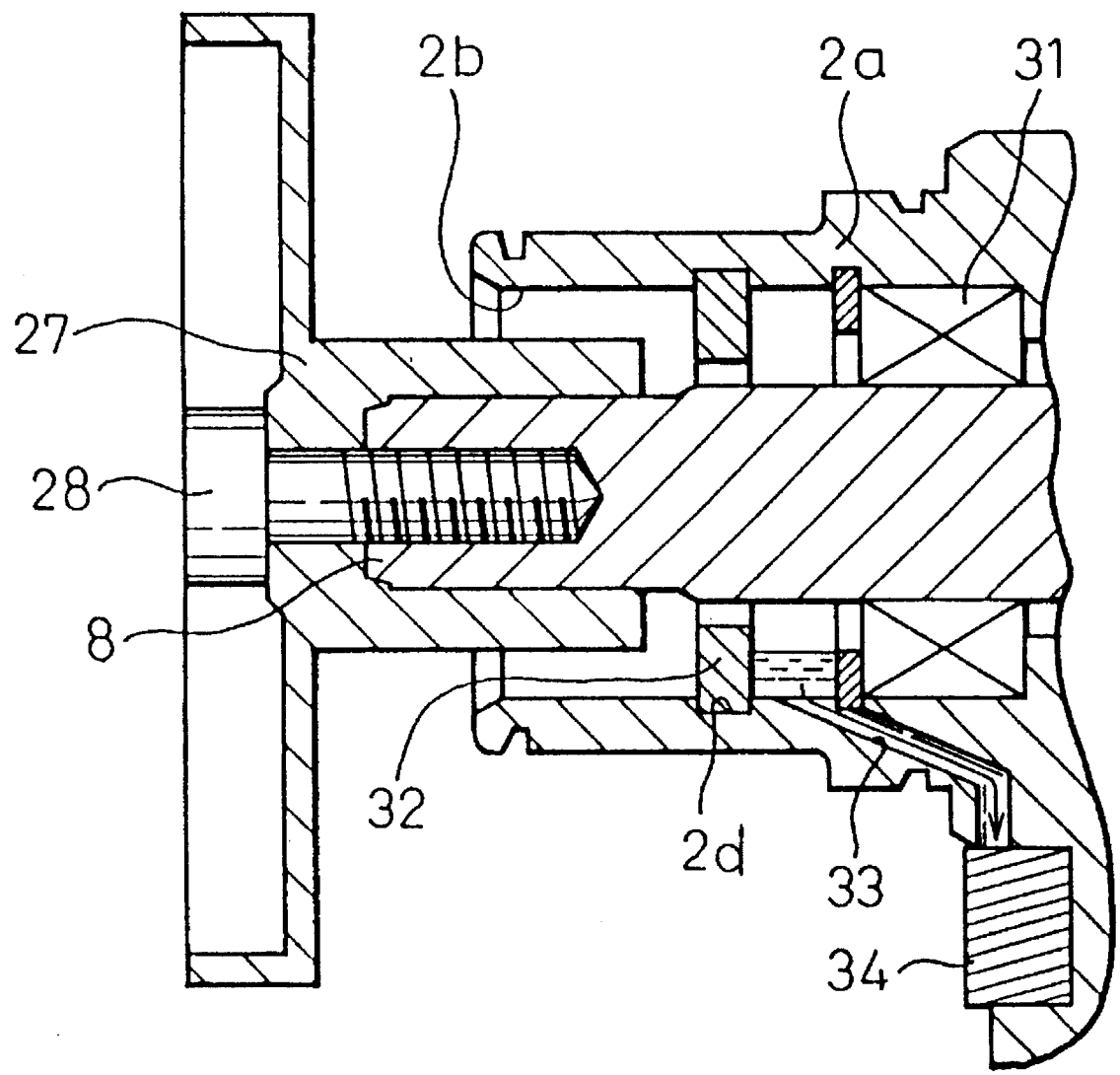
FIG. 2B is a view similar to FIG. 2A, illustrating a modification of the oil diverting unit of the first embodiment.

Referring to FIGS. 1, 2a and 2b illustrating a first embodiment of the present invention, a refrigerant compressor is provided with a cylinder block 1 constituting a part of the outer casing of the compressor, a front housing 2 gas-tightly connected to the front end of the cylinder block 1 for defining therein a crank chamber 7, and a rear housing 5 gas-tightly connected to the rear end of the cylinder block 1 for defining therein a suction chamber 3 for refrigerant gas before compression and a discharge chamber 4 for the refrigerant gas after compression. A valve plate 6 intervenes between the rear end of the cylinder block 1 and the rear housing 5 so as to arrange suction and discharge valve mechanisms between cylinder bores 14 of the cylinder block 1 and the suction and discharge chambers 3 and 4. In the crank chamber 7, an axial drive shaft 8 is centrally extended and is supported by anti-friction bearings 9 and 10 so as to be rotated about an axis of rotation when it is driven. The front anti-friction bearing 9 is seated in a central bore of the front housing 2, and the rear anti-friction bearing 10 is seated in a central bearing bore of the cylinder block 1. A fore end of the drive shaft 8 extends outward through the central bore of the front housing 2 beyond the foremost end of the front housing 2, so that the drive shaft 8 may be connected to an automobile engine via a solenoid clutch unit and a power transmission unit mounted on the fore end of the drive shaft 8.

The axial drive shaft 8 is provided with a swash plate member 11 which is fixedly mounted thereon so as to be rotated together. The swash plate member 11 has a front bearing face, a rear working face inclined at a fixed angle with respect to a plane perpendicular to the axis of rotation of the drive shaft 8, and a rear boss portion having a cylindrical outer surface.

The swash plate member 11 is axially supported by a thrust bearing 21a arranged between the front face of the swash plate member 11 and an inner wall of the front housing 2. On the boss portion of the swash plate member 11, a wobbling member 12 in the form of a disc is mounted via a thrust bearing 21b and a slide bearing so that the rotation of the swash plate member 11 is not transmitted to the wobbling member 12. Namely, the rotation of the swash plate member 11 causes only a wobbling or nutating motion of the wobbling member 12 due to provision of the thrust bearing 21b seated on the rear inclined face of the swash plate member 11 and the slide bearing on the boss of the swash plate member 11. Further, the working member 12 is prevented from being rotated by the engagement of a slitted guide portion 12a thereof and a long axial bolt 13 fixed to the front housing 2 and the cylinder block 1.

The wobbling member 12 is engaged with a plurality of single-headed pistons 15 slidably fitted in the cylinder bores 14 of the cylinder block 1, via respective connecting rods 16. Namely, each connecting rod 16 has balls on opposite ends socketed in the wobbling plate 12 and corresponding piston 15. Thus, when the wobbling member 12 nutates around an axis corresponding to the axis of rotation of the drive shaft 8, the respective single-headed pistons 15 reciprocate in the cylinder bores 14 of the cylinder block 1. The cylinder block 1 is provided with a bearing bore in a central protrusion 1a formed at the central portion thereof, in which the anti-friction bearing 10 is seated in a press-fitted manner. The rear end of the drive shaft 8, supported by the anti-friction bearing 10, confronts a thrust race member 19 and a belleville washer 20 disposed in the end of the bearing bore in the central protrusion 1a. The belleville washer 20 constantly urges the drive shaft 8 towards the front of the drive shaft 8.

The front housing 2 is provided with a front boss portion 2a formed at a central portion thereof so as to protrude forward, and to enclose the fore end of the drive shaft 8. A stator assembly 22 including a stator core 24 and a solenoid 23 seated in the stator core 24 is rotatably mounted on the front boss portion 2a of the front housing 2 via an anti-friction radial bearing 25. The front end face of the stator core 24 of the stator assembly 22 is formed as a magnetic pole electro-magnetically cooperating with a movable magnetic pole element 30. A grooved pulley member 24a is fixed to the outer circumference of the stator core 24, and a power transmission belt 26 is wound around the pulley member 24a so as to transmit a drive power from an automobile engine to the stator core 24 via the pulley member 24a. Thus, during the operation of the automobile engine, the drive power is constantly transmitted to the stator core 24 so that the stator core 24 is constantly rotated around the boss portion 2a of the front housing 2.

The front end of the drive shaft 8 extending through a central bore 2b of the boss portion 2a of the front housing 2 is provided with a clutch hub member 27 attached thereto by a screw bolt 28, and the movable magnetic pole element 30 in the form of an annular plate which is held by a cylindrical support member 30a attached to the clutch hub member 27 via a ring-like elastic member 29 made of e.g. rubber material or like plastic material. Namely, the elastic member 29 provides the movable magnetic pole element 30 with an axial movability against the confronting front face of the stator core 24. When the stator core 24 is electro-magnetically excited by the solenoid 23, the movable magnetic pole element 30 is magnetically attracted to the front end face of the stator core 24. When the solenoid 23 is electrically de-energized, the movable magnetic pole element 30 is disconnected from the stator core 24. The solenoid 23 is operatively connected to a switching means for turning on or off the climate control system of the automobile. The switching means is arranged in a driver's compartment so as to be operated by a driver. Thus, when the switch means is turned on, the solenoid 23 of the stator assembly 22 is energized, and when the switch means is turned off, the solenoid 23 of the stator assembly 22 is de-energized. Namely, the stator assembly 22 and the magnetic pole member 30 constitute a solenoid clutch.

It should be understood that a small amount of air-gap is provided between the front end face of the stator core 24 and the movable magnetic pole element 30. Therefore, when the automobile engine is in operation, the stator core 24 is constantly rotated together with the toothed pulley member 24a around the boss portion 2a of the front housing 2. The rotation of the stator core 24 of the stator assembly 22 is transmitted to the clutch hub member 27, only when the movable magnetic pole element 30 is magnetically connected to the stator core 24. When the magnetic pole element 30 is disconnected from the stator core 24, the latter idles, and the drive shaft 8 of the refrigerant compressor does not rotate.

When the above-mentioned switch means is turned on so as to energize the solenoid 23, and when the magnetic pole member 30 is axially attracted and connected to the stator core 24 of the stator assembly 22 via elastic deformation of the elastic member 29, the rotation of the toothed pulley member 24a and the stator core 24 is transmitted to the movable magnetic pole member 30 and to the clutch hub member 27. Thus, the drive shaft 8 of the refrigerant compressor is connected to the engine and is rotated so as operate the compressor.

In the central bore 2b of the front boss portion 2a of the front housing 2, a shaft seal unit 31 consisting of lip-seal member or a mechanical seal member is press-fitted and arranged at a position in front of the anti-friction bearing 9 so as to seal the interior of the front housing 2 of the compressor. Thus, the shaft seal unit 31 prevents refrigerant gas and the lubricating oil suspended in the refrigerant gas from leaking from the crank chamber 7 toward the outside of the front housing 2.

An oil blocking plate member 32 in the form of a ring element made of elastic material such as rubber or flexible plastic material is fitted in the central bore 2b of the boss portion 2a of the front housing 2 at a position in front of the shaft seal unit 31. The oil blocking plate member 32 is manufactured so as to have an outer diameter larger than an inner diameter of the central bore 2b of the boss portion 2a of the front housing 2, and therefore, the outer circumference of the oil blocking plate member 32 is tightly fitted in the inner wall of the central bore 2b. The oil blocking plate member 32 defines an oil dam portion between the rear face thereof and the front face of the shaft seal unit 31 in the central bore 2b of the boss portion 2a. A drain passageway 33 having one opening end communicated with the dam portion is extended through the boss portion 2a of the front housing 2. The other end of the drain passageway 33 is disposed at a position adjacent to a recess 2c formed in an external wall portion of the front housing 2, and an oil holding member 34 such as an oil-absorbent felt member is arranged in the recess 2c.

The operation of the refrigerant compressor provided with the above-mentioned construction will be described hereinbelow.

When the switch means for turning on and off the climate system is turned off, the solenoid 23 of the stator assembly 22 is de-energized, and accordingly, the air gap between the stator core 24 and the movable magnetic pole member 30 disconnects the latter from the former. Thus, the drive shaft 8 of the compressor is not driven, and therefore, the refrigerant compressor is stopped.

When the switch means is turned on, the solenoid 23 is energized so as to magnetize the front end face of the stator core 24 to thereby magnetically attract the movable magnetic pole member 30. Therefore, the refrigerant compressor is operatively connected to the automobile engine, and the drive shaft 8 of the compressor is rotated. Accordingly, the swash plate member 11 is also rotated.

The rotation of the swash plate 11 with the drive shaft 8 causes the wobbling member 12 to make wobbling or nutating motion to thereby reciprocate all of the single-headed pistons 15 in the cylinder bores 14 of the cylinder block 1 via the connecting rods 16. When respective pistons 15 move away from the valve plate 6, compression chambers in the cylinder bores 14 are enlarged so as to suck in the refrigerant gas from the suction chamber 3 via respective suction ports 17 formed in the valve plate 6 and suction valves (not shown). When the respective single-headed pistons 15 move toward the valve plate 6, the refrigerant gas is compressed in the compression chambers of the respective cylinder bores 14, and is discharged from the compression chambers toward the discharge chamber 4 via discharge ports 18 and discharge valves (not shown).

During the operation of the compressor, the compressed refrigerant gas leaks from the respective cylinder bores 14 toward the crank chamber 7 through a small gap extending around the pistons 15 and the wall of the cylinder bores 14, and therefore, pressure of the refrigerant gas prevailing in the crank chamber 7 is higher than the atmospheric pressure. Accordingly, lubricating oil in the form of an oil mist suspended in the refrigerant gas tends to flow toward the central bore 2b of the boss portion 2a of the front housing 2, and to flow towards the front portion of the axial drive shaft 8 through the anti-friction bearing 9 and through the shaft seal unit 31 which prevents leakage of the compressed refrigerant gas from the crank chamber 7.

At this stage, due to provision of the oil blocking plate member 32 in front of the shaft seal unit 31, the flow of the lubricating oil is obstructed so as to be held in the dam portion between the shaft seal unit 31 and the oil blocking plate member 32 of the oil diverting unit as best shown in FIG. 2A. Then, the lubricating oil is drained from the dam portion through the drain passageway 33 toward the oil holder member 34 seated in the recess 2c of the front housing 2. The lubricating oil is then held by the oil holder member 34. The lubricating oil held by the oil holder member 34 is gradually and naturally evaporated because an amount of the lubricating oil leaking from the interior of the front housing 2 is very small. If the amount of the lubricating oil held by the oil holder member 34 is excessive, the excessive lubricating oil drops from the oil holder member 34 onto a lower surface. Nevertheless, the small amount of lubricating oil has no adverse affect on either the refrigerant compressor or the automobile.

In the first embodiment shown in FIGS. 1 and 2A, the oil blocking plate member 32 made of elastic material is elastically and tightly fitted in the central bore 2b, and therefore, the lubricating oil oozing out of the shaft seal unit 31 can be blocked and is completely prevented from flowing toward the front of the drive shaft 8. Thus, the lubricating oil is not brought into contact with the solenoid clutch mounted on the front portion of the drive shaft 8. That is, during the operation of the refrigerant compressor, the lubricating oil leaking from the interior of the body of the compressor through the central bore 2b of the front housing 2 does not reach the contacting portion between the movable magnetic pole member 30 and the stator core 24 of the stator assembly 22. Therefore, neither slipping of the solenoid clutch, nor frictional heat due to the slippage of the solenoid clutch causing seizure of the clutch plates (i.e., the magnetic pole member 30 and the stator core 24), occurs. Namely, it is ensured that a smooth and stable connection between the stator core 24 and the magnetic pole member 30 is accurately achieved so as to transmit the drive power from the automobile engine to the drive shaft 8 of the refrigerant compressor.

It should be appreciated that according to the first embodiment of the present invention, the oil blocking plate member 32 consisting of a ring-like member made of elastic material such as rubber or a flexible plastic material can be a low-cost product easily manufactured by a stamping method in which a plurality of oil blocking members 32 can be simultaneously stamped out of a rubber sheet material or by an injection method in which a plurality of oil blocking members 32 are continuously injected by using a plastic injection machine. Further, as the oil blocking plate member 32 is elastically press-fitted in the central bore 2b of the boss portion 2a of the front housing 2, it is not required to be a dimensionally accurate member, and accordingly, the oil blocking plate member 32 can be an easily-produced low-cost member.

It should be understood that the outer circumference of the oil blocking plate member 32 may not be cylindrical, and may be a conical outer circumference or a tapered outer circumference with an annular step or steps. Then, the press-fitting of the oil blocking plate member 32 into the central bore 2b of the boss portion 2a can be made easier. Further, the manufacturing of the oil blocking plate member 32 can be rough enough to lower the production cost of the member 32.

Moreover, as clearly shown in FIG. 2B, the oil blocking plate member 32 may be modified so as to be press-fitted in an annular recess 2d formed in the inner wall of the central bore 2b of the boss portion 2a of the front housing 2. The fitting of the oil blocking plate member 32 in the annular recess 2d can further ensure the prevention of lubricating oil flowing towards the front of the drive shaft 8 of the compressor.

Figure 3:
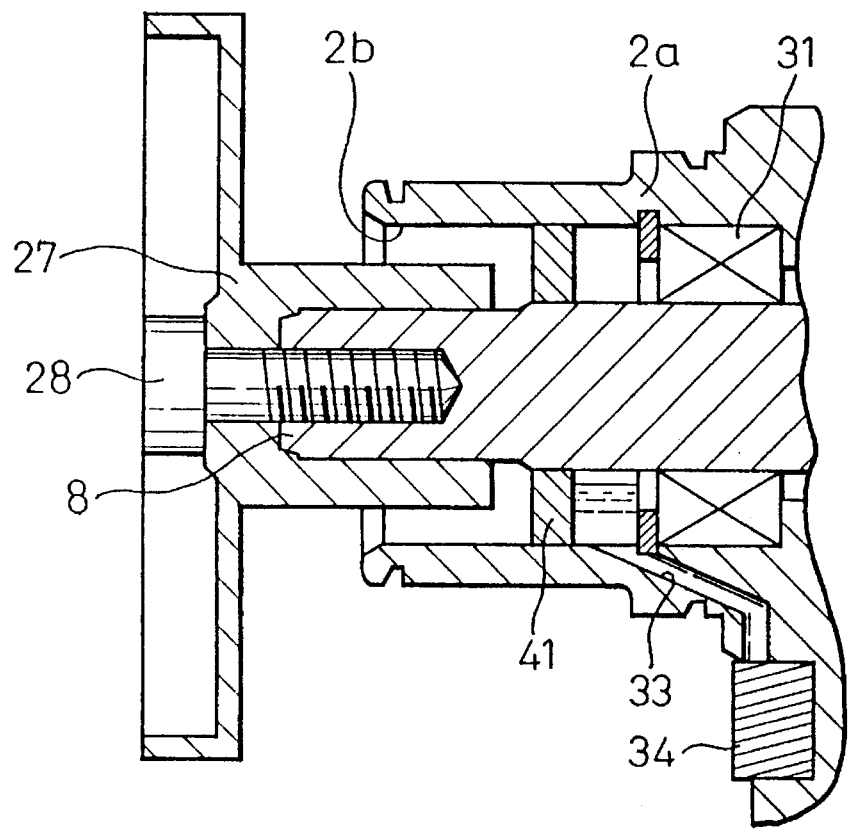
FIG. 3 is a view similar to FIG. 2A, illustrating an oil diverting unit according to a second embodiment of the present invention.
Figure 4:
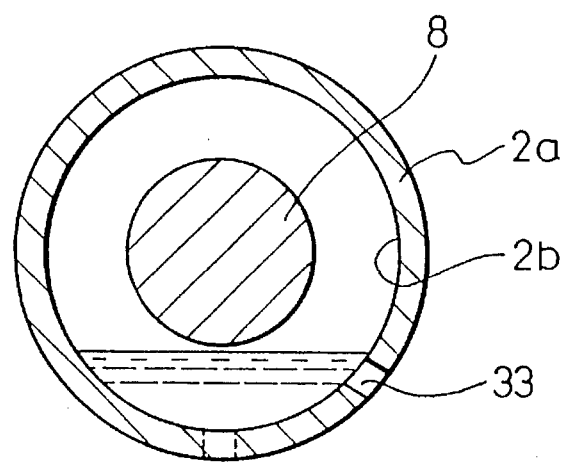
FIG. 4 is a cross-sectional view illustrating the construction of an oil dam portion of the oil diverting unit of the second embodiment.

Referring to FIGS. 3 and 4 illustrating the oil diverting unit according to the second embodiment of the present invention, an oil blocking plate member 41 is provided with a central bore in which the axial drive shaft 8 of the refrigerant compressor is inserted leaving no appreciable gap between the bore wall of the oil blocking plate member 41 and the outer circumference of the drive shaft 8. The oil blocking plate member 41 can completely block the flow of the lubricating oil leaking from the shaft seal unit 31 toward the fore end portion of the drive shaft 8, and define an oil dam portion in front of the shaft seal unit 31. Therefore, the oil diverting unit including the oil blocking plate member 41, according to the second embodiment can completely prevent the lubricating oil from having an adverse affect on the solenoid clutch mounted on the front of the drive shaft 8 in the same manner as the first embodiment.

In addition, according to the oil blocking plate member 41 of the second embodiment, more lubricating oil can be held in the oil dam portion than in the first embodiment due to the fitting of the oil blocking plate member 41 and the drive shaft 8 with a small gap therebetween. Accordingly, even if the opening of the drain passageway 33 in the front housing 2 is not located in the position shown by dotted lines in FIG. 4, and is located at another portion of the oil dam portion as shown by solid lines in FIG. 4, a large part of the held oil can be gradually drained through the drain passageway 33 toward the oil holder member 34. Thus, according to the second embodiment, the mounting of the refrigerant compressor in the engine compartment of an automobile is not limited. For example, the body of the compressor may be mounted in the automobile in such a manner that the drain passageway is not directly below the axis of the drive shaft 8 without deteriorating the oil drainage performance of the oil obstructing unit. That is, a change in the position of the drain passageway 33 is not required in response to a change in the angular position of the compressor body when mounting the refrigerant compressor in an automobile.

It should be appreciated that even if the central bore of the oil blocking plate member 41 and the outer circumference of the drive shaft 8 are in contact, the rotating of the drive shaft 8 is not adversely affected by the oil blocking plate member 41. This is because the oil blocking plate member 41 is made of elastic material such as rubber material. Namely, the oil blocking plate member 41 can be easily deformed so as to fit the outer circumference of the drive shaft 8 during the rotation of the shaft 8. Thus, the manufacture of the oil blocking plate member 41 can be rough enough to lower the manufacturing cost.

Figure 5:
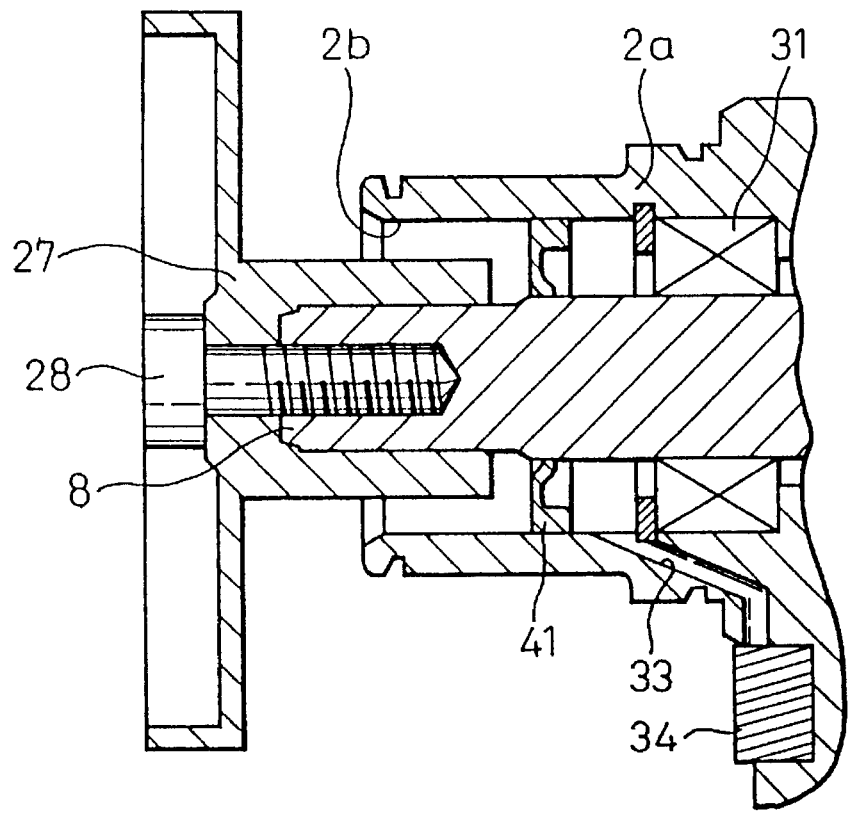
FIG. 5 is a view similar to FIG. 4, illustrating a modification of the oil diverting unit of the second embodiment.

The oil blocking plate member 41 of the oil diverting unit according to the second embodiment may be modified to that shown in FIG. 5. In the modified oil blocking plate member 41 as shown in FIG. 5, a shallow recess is formed in the face confronting the shaft seal unit 31 so as to increase the oil-holding volume of the oil dam formed between the shaft seal unit 31 and the oil blocking plate member 41. As a result, the location of the opening of the drain passageway 33 can be freely moved from the bottom portion of the oil dam. Thus, this construction of the oil blocking plate member 41 of the oil diverting unit may permit a refrigerant compressor to be mounted in an automobile without any strict restriction as to the angular position of the compressor about the axis of the drive shaft 8.

Figure 6:
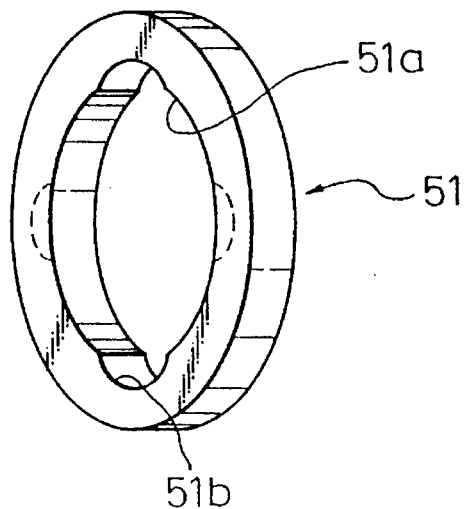
FIG. 6 is a perspective view of an oil blocking plate member of an oil diverting unit according to a third embodiment of the present invention.

Referring to FIG. 6, an oil blocking plate member 51 of the oil diverting unit according to the third embodiment is formed as an annular member having a central bore 51a having a diameter larger than the outer diameter of the drive shaft 8 of the compressor, and the cylindrical wall of the central bore 51a is provided with a pair of diametrically opposed recesses 51b. The oil blocking plate member 51 is press-fitted in the central bore 2b of the boss portion 2a of the front housing 2 of a refrigerant compressor in the same manner as described in the first and second embodiments.

Figure 7:
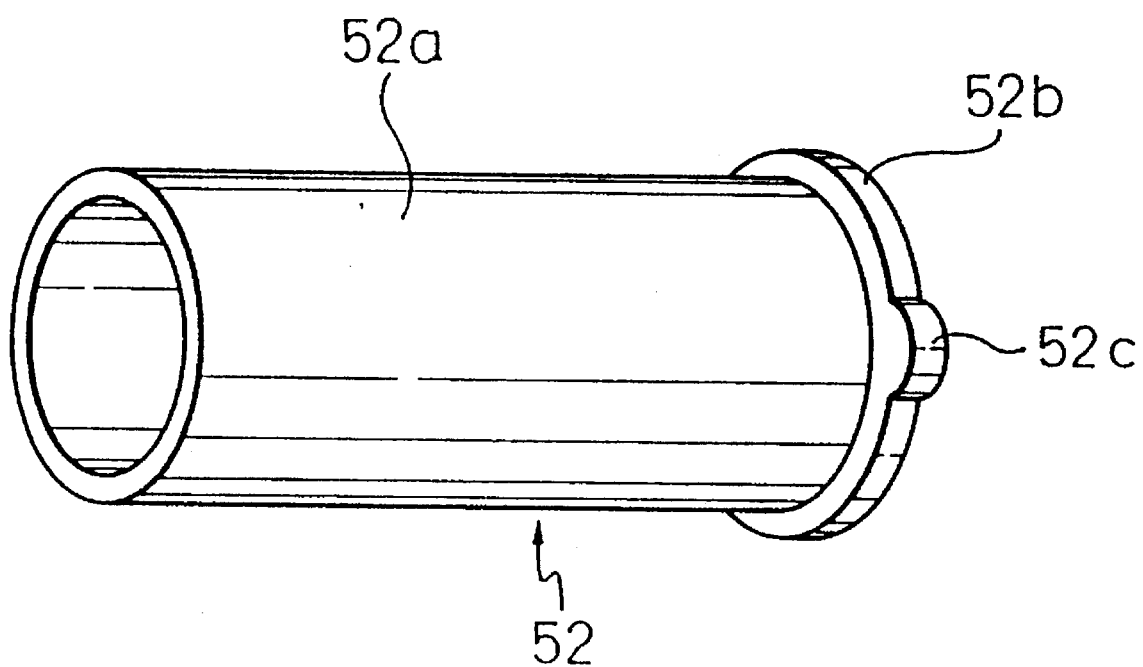
FIG. 7 is a perspective view of a tool for removing the oil blocking plate member of FIG. 6 from the drive shaft of a compressor.
Figure 8:
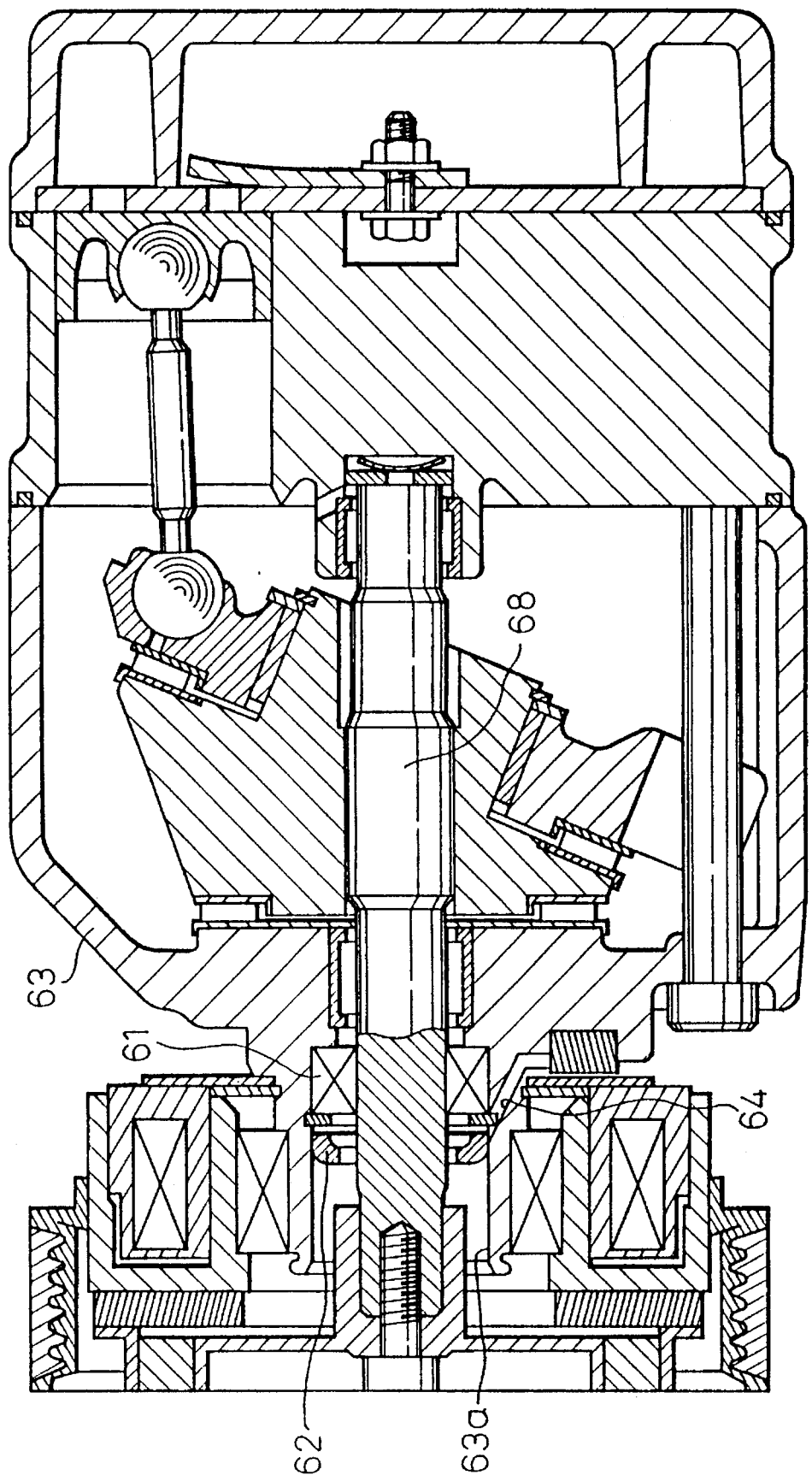
FIG. 8 is a longitudinal cross-sectional view of a refrigerant compressor for an automobile climate control system, incorporating therein an oil diverting unit according to an example of the prior art.
Figure 9:
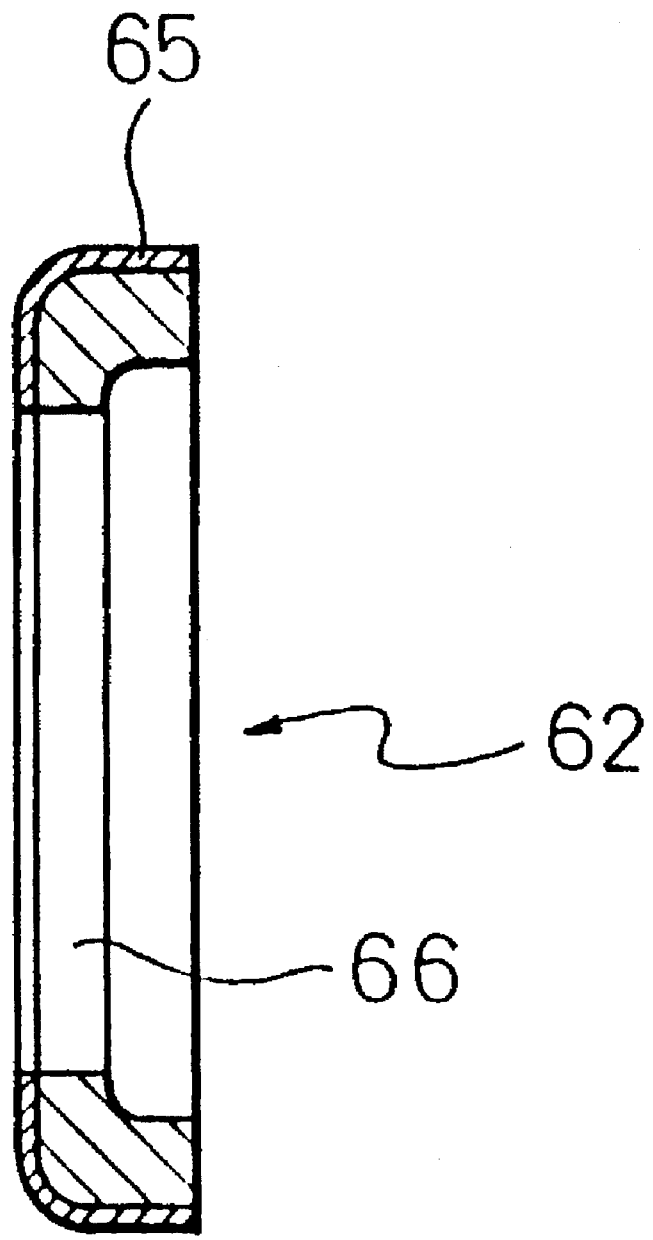
FIG. 9 is a cross-sectional view of an oil diverting unit according to the prior art.

The oil blocking plate member 51 of the third embodiment is characterized in that it is easily removed from the central bore 2b of the boss portion 2a of the front housing 2 of the compressor by using an appropriate tool such as the tool 52 shown in FIG. 7. The tool 52 is provided with a hollow cylindrical portion 52a having a flange portion 52b formed at one end portion thereof so as to be annularly extending around the outer cylindrical surface of the end portion. The annular flange portion 52b has an outer diameter substantially equal to or less than the diameter of the central bore 51a of the blocking plate member 51. The flange portion 52b of the tool 52 further has a pair of diametrically opposed projections 52c which are substantially complementary with the pair of recesses 51b in the oil blocking plate member 51.

When the tool 52 is used for removing the oil blocking plate member 51 from the compressor, it is inserted on the drive shaft 8 of the compressor after dismounting the solenoid clutch unit from the front of the drive shaft 8 of the compressor, so that the flange portion 52b of the tool 52 may pass through the central bore 51a of the oil blocking plate member 51 press-fitted in the central bore 2b of the boss portion 2a of the compressor housing 2. Further, when the protrusions 52c of the annular flange portion 52b of the tool 52 are aligned with the recesses 51b of the oil blocking plate member 51, the tool 52 can be further pressed so that the flange portion 52b of the tool 52 passes completely through the central bore 51a of the oil blocking plate member 51. Subsequently, the tool 52 is turned about the axis of rotation of the drive shaft 8, so that the projections 52c of the annular flange portion 52b of the tool 52 are disposed at positions as shown by dotted lines in FIG. 6. Then, the tool 52 is pulled off the drive shaft 8 of the compressor so that the oil blocking plate member 51 may also be pulled out of the central bore 2b of the boss portion 2a of the front housing 2 of the compressor. Thus, the oil blocking plate member 51 is eventually removed from the compressor. When the oil blocking plate member 51 is removed, it is possible to replace the shaft seal unit 31 mounted on the fore end of the drive shaft 8 with a fresh unit 31 as required.

In the illustrated third embodiment, the oil blocking plate member 51 is provided with the cylindrical central bore 51a and a pair of round recesses 51b. However, the shape of the central bore 51a is not limited to the cylindrical one, and may be modified to a different shape, if the oil blocking plate member 51 can be removed by a tool which can be used in substantially the same manner as the tool 52 of FIG. 7.

From the foregoing description, it will be understood that according to the present invention, the oil diverting unit including an oil blocking member, an oil dam portion, and an oil drain passageway can completely divert the flow of the lubricating oil leaking from the shaft-seal unit for the drive shaft of a refrigerant compressor incorporated in a climate control system of an automobile. Thus, the lubricating oil leaking out of the interior of the body of the compressor can be prevented from flowing towards the front portion of the drive shaft, and accordingly, a solenoid clutch unit mounted on the front portion of the drive shaft is not subjected to any adverse affect such as being wetted by the lubricating oil. The oil diverting unit of the present invention may be applied to various types of refrigerant compressors incorporated in climate control systems of automobiles, such as the described swash plate type compressor, a vane type compressor, and a scroll type refrigerant compressor.

It should be understood that many modifications and variations of the present invention will occur to persons skilled in the art without departing from the scope and spirit of the present invention as claimed in the accompanying claims.

We claim:

1. An oil diverting unit for a refrigerant compressor to be incorporated in a climate control system of an automobile, the oil diverting unit cooperating with a shaft seal unit arranged in a central bore of an axially extending portion of a housing of the refrigerant compressor, so as to tightly seal an axial drive shaft having a front portion thereof outwardly extending through the central bore of the axially extending portion of the housing of the refrigerant compressor, the axial drive shaft having mounted on the front portion thereof a clutch unit arranged to cooperate with an external drive source, the oil diverting unit being arranged between the shaft unit and the clutch unit to obstruct a flow of lubricating oil, which was suspended in a refrigerant gas, leaking out of the interior of the housing via the shaft seal unit, said oil diverting unit comprising:

an oil blocking plate member made of an elastic material arranged in said central bore of said axially extending portion of the housing at an intermediate position between an axially outer face of said shaft seal unit and a mounting position of the clutch unit on said front portion of said drive shaft, for defining an oil dam between said oil blocking plate member and said shaft seal unit for holding the flow of the lubricating oil leaking out of the interior of said housing via said shaft seal unit, said oil blocking plate member being in the form of a ring member having an outer circumference press-fitted in the central bore of the axially extending portion of the housing and a central bore through which said front portion of said drive shaft extends, said central bore being formed so as to have a pair of diametrically opposed recessed formed in a bore wall portion thereof for permitting a single piece tool having a cylindrical portion with a pair of fixed diametrical projections engageable with bore wall portion of said central bore of said oil blocking plate member whereby said oil blocking plate member can be pulled and removed by said fixed projections of said tool from the central bore of the axially extending portion of the housing of the compressor; and a drain passageway means formed in said housing, and having an oil port fluidly communicating with said oil dam for draining the lubricating oil from said oil dam and an oil discharge port communicating with an exterior of said housing of the compressor for draining the lubricating oil toward the exterior of said housing.

2. An oil diverting unit according to claim 1, wherein said central bore of said oil blocking plate member has a diameter such that the bore wall of said central bore of said oil blocking plate member is in constant contact with an outer circumference of said drive shaft whereby the flow of the lubricating oil directing from said shaft seal unit toward said oil blocking plate member along a wall surface of said central bore of said housing as well as along said circumference of said drive shaft is obstructed by said oil blocking plate member.

3. An oil diverting unit according to claim 2, wherein said oil blocking plate member of said oil diverting unit comprises an elastic disk having said central bore of which the bore wall is in constant contact with the outer circumference of said drive shaft, said elastic disk being provided with a side face confronting said shaft seal unit and having a recessed portion formed therein to thereby increase the volume of said oil dam.

4. An oil diverting unit according to claim 1, wherein said oil blocking plate member of said oil diverting unit comprises an elastic disk having an outer diameter larger than an inner diameter of said central bore of said axially extending portion of said housing of the compressor whereby said elastic disk is in an elastically tight contact with a bore wall of said central bore of said axially extending portion of said housing.

5. An oil diverting unit according to claim 1, wherein said oil blocking plate member of said oil diverting unit comprises an elastic disk having an outer diameter larger than an inner diameter of said central bore of said axially extending portion of said housing of the compressor whereby said elastic disk is elastically fitted in an annular recess formed in a bore wall of said central bore of said axially extending portion of said housing.

6. An oil diverting unit according to claim 1, wherein said oil blocking plate member of said oil diverting unit comprises a centrally bored rubber disk.

7. A refrigerant compressor adapted for being driven by an automobile engine for compressing a refrigerant gas circulated through a climate control system of an automobile comprising:

a cylinder block provided with a plurality of cylinder bores for receiving respective pistons reciprocating therein so as to compress the refrigerant gas and to discharge the compressed refrigerant gas toward said climate control system;

a front housing connected to a front end of said cylinder block and having a crank chamber therein for receiving a swash plate type piston-reciprocating unit, the front housing including an axially extending boss portion provided with a central bore formed therein, and the crank chamber being subjected to a high pressure compressed refrigerant gas during the operation of said compressor;

an axial drive shaft rotatably held by said cylinder block and said front housing for driving said swash plate type piston-reciprocating unit, said axial drive shaft having a front portion extending through said central bore of said axially extending boss portion of said front housing;

a shaft-seal unit arranged in said central bore of said axially extending boss portion of said front housing for gas-tightly sealing said crank chamber of said front housing;

a solenoid clutch unit mounted on said front portion of said axial drive shaft for connecting said axial drive shaft to said automobile engine upon being energized; and an oil diverting unit cooperating with said shaft seal unit for diverting a flow of lubricating oil which was suspended in the refrigerant gas and has leaked out of the interior of said crank chamber of said front housing via said shaft seal unit arranged between the shaft seal unit and the solenoid clutch, said oil diverting unit comprising:

an oil blocking plate member made of an elastic material press-fitted in said central bore of said axially extending boss portion of said front housing at a position between an axially outer face of said shaft seal unit and the solenoid clutch unit, for defining an oil dam between said oil blocking plate member and said shaft seal unit for holding the flow of the lubricating oil leaking out of the interior of said front housing via said shaft seal unit, said oil blocking plate member having a central bore thereof through which said front end portion of said axial drive shaft extends and a pair of diametrically opposed recesses formed in a bore wall thereof for permitting a single piece tool having a cylindrical portion with a pair of fixed diametrical projections engageable with the bore wall portion of said central bore of said oil blocking plate member whereby said oil blocking plate member can be pulled and removed by said fixed projections of said tool from the central bore of the axially extending portion of the housing; and a drain passageway means formed in said front housing, and having an oil port fluidly communicating with said oil dam for draining the lubricating oil from said oil dam and an oil discharge port communicating with an exterior of said housing for draining the lubricating oil toward the exterior of said compressor.

8. A refrigerant compressor according to claim 7, wherein said oil blocking plate member of said oil diverting unit comprises a centrally bored rubber disk.

9. A refrigerant compressor according to claim 7, wherein said solenoid clutch includes electro-magnetically confronting fixed and movable clutch plate members formed as magnetic poles, said movable clutch plate being elastically movable with respect to said fixed clutch plate member.

10. An oil diverting unit according to claim 1, wherein said central bore of said oil blocking plate member has a diameter larger than an outer diameter of said drive shaft.

11. An oil diverting unit according to claim 10, wherein said oil blocking plate member of said oil diverting unit is provided with a side face opposing said shaft seal unit and formed with a recessed portion.

\* \* \* \* \*